(12) United States Patent
Vaidyanathan et al.

(10) Patent No.: US 8,214,682 B2
(45) Date of Patent: Jul. 3, 2012

(54) SYNCHRONIZING SIGNALS RELATED TO THE OPERATION OF A COMPUTER SYSTEM

(75) Inventors: Kalyanaraman Vaidyanathan, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1118 days.

(21) Appl. No.: 12/101,321

(22) Filed: Apr. 11, 2008

(65) Prior Publication Data
US 2009/0259871 A1     Oct. 15, 2009

(51) Int. Cl.
*G06F 1/12*      (2006.01)
*G06F 13/42*     (2006.01)
*G06F 1/00*      (2006.01)
*H04L 5/00*      (2006.01)
*H04L 7/00*      (2006.01)

(52) U.S. Cl. ........................................ 713/400; 713/300
(58) Field of Classification Search .................. 713/300, 713/400; 702/179, 180, 181
See application file for complete search history.

(56) References Cited

U.S. PATENT DOCUMENTS

| | | | |
|---|---|---|---|
| 5,748,314 A * | 5/1998 | Kitayoshi | 356/450 |
| 6,594,605 B2 * | 7/2003 | Kurosawa | 702/106 |
| 7,386,417 B1 * | 6/2008 | Bao et al. | 702/179 |
| 7,809,046 B2 * | 10/2010 | Mujtaba et al. | 375/145 |
| 2009/0092038 A1 * | 4/2009 | Mujtaba et al. | 370/208 |

* cited by examiner

*Primary Examiner* — Chun-Kuan Lee
*Assistant Examiner* — Getente A Yimer
(74) *Attorney, Agent, or Firm* — Park, Vaughan, Fleming & Dowler LLP

(57) ABSTRACT

Some embodiments of the present invention provide a system that synchronizes signals related to the operation of a computer system. During operation, a set of correlation coefficients between a first signal and a second signal is generated, wherein each correlation coefficient is associated with a different phase shift between the first signal and the second signal. Then, a synchronizing phase shift associated with the highest correlation coefficient in the set of correlation coefficients is determined in order to synchronize the first signal and the second signal.

18 Claims, 5 Drawing Sheets

SYNCHRONIZING SIGNALS RELATED TO THE OPERATION OF A COMPUTER SYSTEM

BACKGROUND

1. Field

The present invention relates to techniques for enhancing the reliability of computer systems. More specifically, the present invention relates to a method and an apparatus for synchronizing signals related to the operation of a computer system.

2. Related Art

Computer manufacturers often desire to characterize the operation of computer systems by measuring the relationship between various operational and performance parameters of the computer systems, including power usage, operating temperature and CPU utilization. Typically, this information is gathered using data acquisition devices that can have different sampling rates, and also may have clocks that are not synchronized. Therefore, the time stamps of signals from these sources may have lead-lag phase discrepancies resulting in difficulties in synchronizing the signals to achieve phase coherence among the separate data streams. This lack of phase coherence between data sources can make it difficult to generate synchronized relationships between the gathered data, such as would be desirable, for example, to generate a graph of computer power usage vs. CPU utilization.

Hence, what is needed is a method and apparatus for synchronizing signals related to the operation of a computer system without the above-described problems.

SUMMARY

Some embodiments of the present invention provide a system that synchronizes signals related to the operation of a computer system. During operation, a set of correlation coefficients between a first signal and a second signal is generated, wherein each correlation coefficient is associated with a different phase shift between the first signal and the second signal. Then, a synchronizing phase shift associated with a highest correlation coefficient in the set of correlation coefficients is determined in order to synchronize the first signal and the second signal.

In some embodiments, the first signal is generated from a first sampled signal and the second signal is generated from a second sampled signal, and a sampling rate of the first sampled signal is different from a sampling rate of the second sampled signal.

In some embodiments, generating the first signal and the second signal involves re-sampling so that a sampling rate of the first signal is equivalent to a sampling rate of the second signal.

Some embodiments additionally generate a set of correlation coefficients between the first signal and a third signal, wherein each correlation coefficient between the first signal and the third signal is associated with a different phase shift between the first signal and the third signal. Then, a synchronizing phase shift is determined, wherein the synchronizing phase shift is associated with a highest correlation coefficient in the set of correlation coefficients between the first signal and the third signal to synchronize the first signal and the third signal.

In some embodiments, the first signal includes information related to one of: a power meter signal, a temperature sensor signal, and a performance parameter signal. The second signal includes information related to one of: the power meter signal, the temperature sensor signal, and the performance parameter signal. The third signal includes information related to one of: the power meter signal, the temperature sensor signal, and the performance parameter signal.

Some embodiments additionally generate a set of correlation coefficients between the second signal and a third signal, wherein each correlation coefficient between the second signal and the third signal is associated with a different phase shift between the second signal and the third signal. Then, a synchronizing phase shift is determined, wherein the synchronizing phase shift is associated with a highest correlation coefficient in the set of correlation coefficients between the second signal and the third signal to synchronize the second signal and the third signal.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
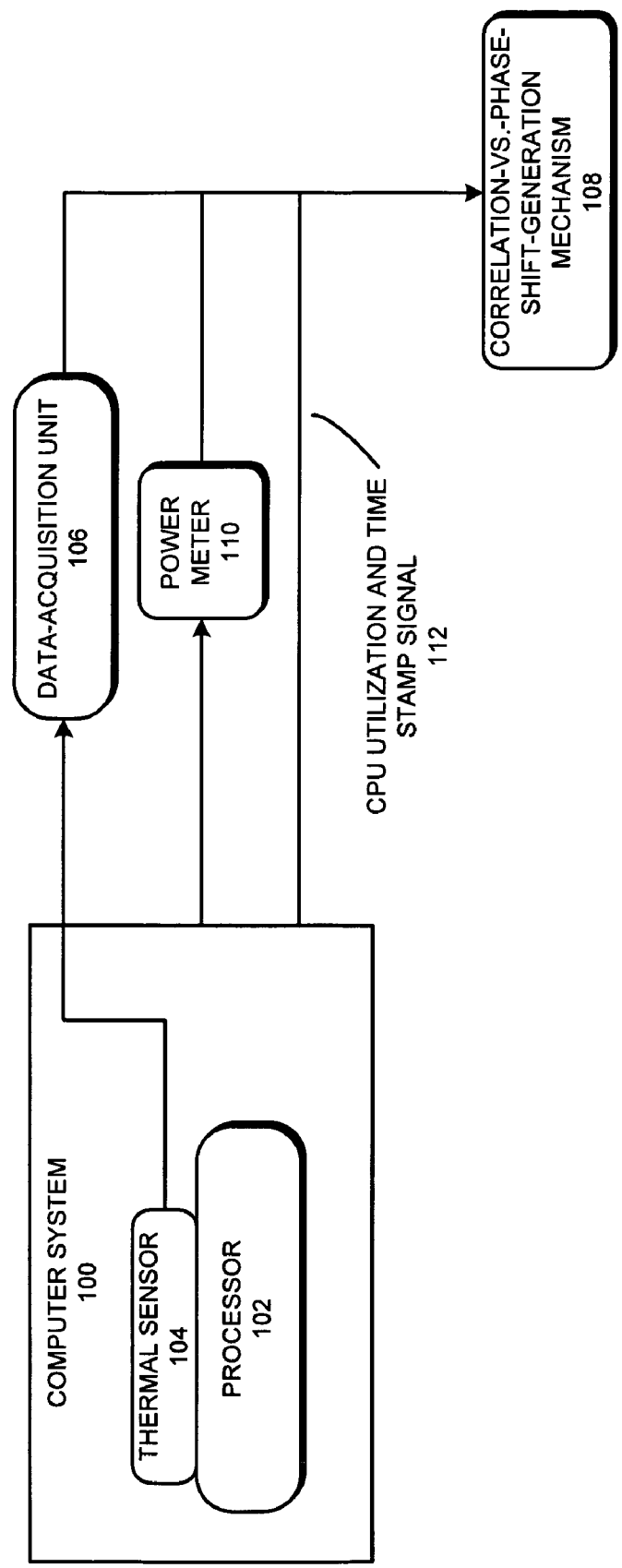
FIG. 1 presents a system that synchronizes signals related to the operation of a computer system in accordance with some embodiments of the present invention.

FIG. 1 presents a system that synchronizes signals related to the operation of a computer system in accordance with some embodiments of the present invention. Computer system 100 includes processor 102 and thermal sensor 104. Thermal sensor 104 detects the temperature of processor 102, and can include but is not limited to any type of sensor that can sense a thermal state of processor 102 now known or later developed. In some embodiments thermal sensor 104 is integrated into processor 102.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Note that although FIG. 1 illustrates computer system 100 with one processor, computer system 100 can include more than one processor. In a multi-processor configuration, the processors can be located on a single system board, or multiple system boards. Computer system 100 can include, but is not limited to, a server, server blade, a datacenter server, a field replaceable unit, or an enterprise computer.

Note that although the present invention is described in the context of computer system 100 as illustrated in FIG. 1, the present invention can generally operate on any type of computer system. Hence, the present invention is not limited to the specific implementation of computer system 100 as illustrated in FIG. 1.

Thermal sensor 104 is coupled to data-acquisition unit 106. Data-acquisition unit 106 receives a signal from thermal sensor 104 related to the temperature of processor 102. Data-acquisition unit 106 time stamps the received signal using an internal clock and sends the time stamp and a signal related to the temperature of processor 102 to correlation-vs.-phase-shift-generation mechanism 108. Data-acquisition unit 106 can be any device that can receive a signal from a thermal sensor 104 and send a signal with a time stamp to correlation-vs.-phase-shift-generation mechanism 108.

Power meter 110 is coupled to computer system 100. Power meter 110 generates a signal related to the power usage of computer system 100. Power meter 110 also generates a time stamp based on an internal clock, and sends the signal and the time stamp to correlation-vs.-phase-shift-generation mechanism 108.

CPU-utilization-and-time-stamp signal 112 is generated by computer system 100. CPU-utilization-and-time-stamp signal 112 is sent to correlation-vs.-phase-shift-generation mechanism 108.

Correlation-vs.-phase-shift-generation mechanism 108 can include any mechanism that can receive CPU-utilization-and-time-stamp signal 112 and signals from data-acquisition unit 106 and power meter 110 and generate a correlation vs. phase shift for each signal pair received. Correlation-vs.-phase-shift-generation mechanism 108 can be implemented in any combination of hardware and software. In some embodiments, correlation-vs.-phase-shift-generation mechanism 108 operates on processor 102. In other embodiments, correlation-vs.-phase-shift-generation mechanism 108 operates on one or more service processors. In still other embodiments, correlation-vs.-phase-shift-generation mechanism 108 is located inside of computer system 100. In yet other embodiments, correlation-vs.-phase-shift-generation mechanism 108 operates on a separate computer system.

In some embodiments correlation-vs.-phase-shift-generation mechanism 108 includes a method or apparatus for monitoring and recording computer system performance parameters as set forth in U.S. Pat. No. 7,020,802 which is hereby fully incorporated by reference. In other embodiments correlation-vs.-phase-shift-generation mechanism 108 receives input from a system or device that includes a method or apparatus for monitoring and recording computer system performance parameters as set forth in U.S. Pat. No. 7,020,802.

In operation, thermal sensor 104 sends a signal related to the thermal state of processor 102 to data-acquisition unit 106. The signal can include, but is not limited to, the temperature of processor 102. Data-acquisition unit 106 digitizes the signal, generates a time stamp for the signal based on an internal clock in data-acquisition unit 106, and sends the signal to correlation-vs.-phase-shift-generation mechanism 108. Simultaneously, power meter 110 measures the power used by computer system 100, digitizes the signal, generates a time stamp, and sends the signal to correlation-vs.-phase-shift-generation mechanism 108. Also, simultaneously, CPU-utilization-and-time-stamp signal 112 is generated by computer system 100 wherein the time stamp is generated using a clock internal to computer system 100, and CPU-utilization-and-time-stamp signal 112 is sent to correlation-vs.-phase-shift-generation mechanism 108.

Correlation-vs.-phase-shift-generation mechanism 108 receives the signals and time stamps from data-acquisition unit 106, power meter 110 and computer system 100. Each signal can have a different sampling rate as determined by the device generating the signal. Also the time stamps for the signals may be out of synchronization if the internal clocks of the devices are out of synchronization.

To synchronize the signals, correlation-vs.-phase-shift-generation mechanism 108 first re-samples each of the signals, if necessary, so that each signal has the sample sampling rate. In some embodiments, a common sampling rate is determined, and each signal is re-sampled at the common sampling rate using an interpolation algorithm wherein the input sample rate of a signal can be up-sampled or down-sampled, as appropriate, using any suitable technique including, but not limited to, linear interpolation or higher-order interpolation.

Next, a correlation coefficient vs. phase shift is determined for each signal pair. Correlation-vs.-phase-shift-generation mechanism 108 then synchronizes each signal pair by determining the phase shift for the highest correlation coefficient for each signal pair. After the signals have been synchronized, the data in each signal can be used to generate graphs, charts, or any other output synchronously relating the data in one signal to one or more of the other signals In some embodiments a correlation coefficient vs. phase shift is determined for each signal in the set of signals with respect to one common signal in the set of signals and all of the signals are synchronized by determining the phase shift for the highest correlation coefficient for each signal with respect to the common signal.

In other embodiments a correlation coefficient vs. phase shift is determined for each signal in the set of signals with respect to the preceding signal in the set of signals, and all of the signals are synchronized by determining the phase shift for the highest correlation coefficient for each signal with respect to the preceding signal in the set of signals.

In yet another embodiment, the signal pairs for which the correlation coefficient vs. phase shift is to be determined are re-sampled to a common sampling rate for each signal pair.

In some embodiments, one or more of the signals does not include a time stamp. In other embodiments, one or more of the devices generating the signals does not generate a time stamp. In still other embodiments, fewer than 3 signals or more than 3 signals are input into correlation-vs.-phase-shift-generation mechanism 108 to be synchronized. In other embodiments, signals input into correlation-vs.-phase-shift-generation mechanism 108 can include, but are not limited to, one or more performance parameters of computer system 100. In other embodiments, the performance parameters are collected by a method or apparatus for monitoring and recording computer system performance parameters as described in U.S. Pat. No. 7,020,802.

Figure 2:
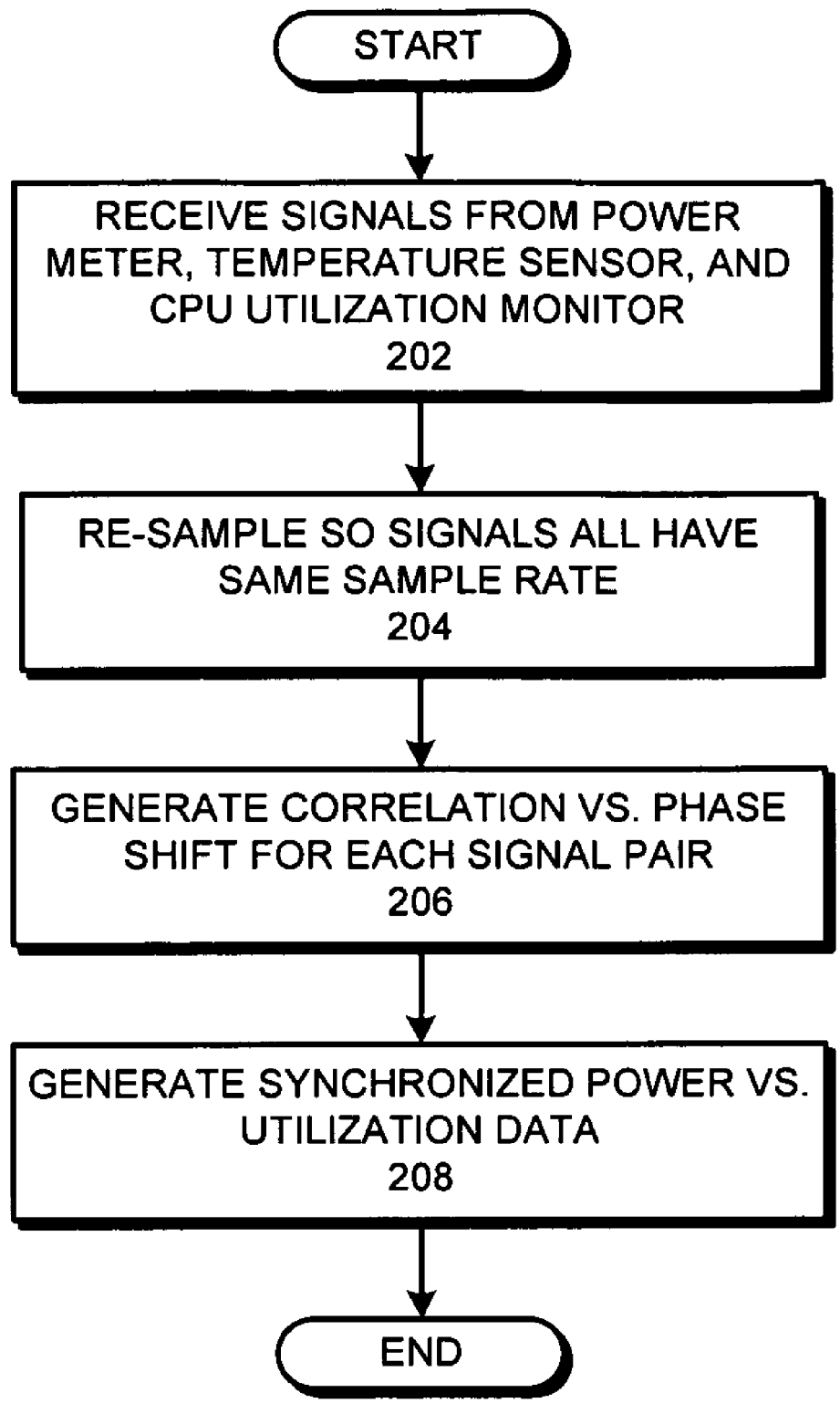
FIG. 2 presents a flowchart illustrating a process for synchronizing signals related to the operation of a computer system in accordance with some embodiments of the present invention.

FIG. 2 presents a flowchart illustrating a process for synchronizing signals related to the operation of a computer system in accordance with some embodiments of the present invention. First, signals are received from a power meter, a temperature sensor, and a CPU utilization monitor (step 202). Next, if required, each signal is re-sampled such that all signals have a common sample rate (step 204). Then, a correlation vs. phase shift is generated for each signal pair (step 206). Next, synchronized power vs. utilization data is generated (step 208), and in some embodiments this data is used to generate a power vs. utilization graph.

Figure 3A:
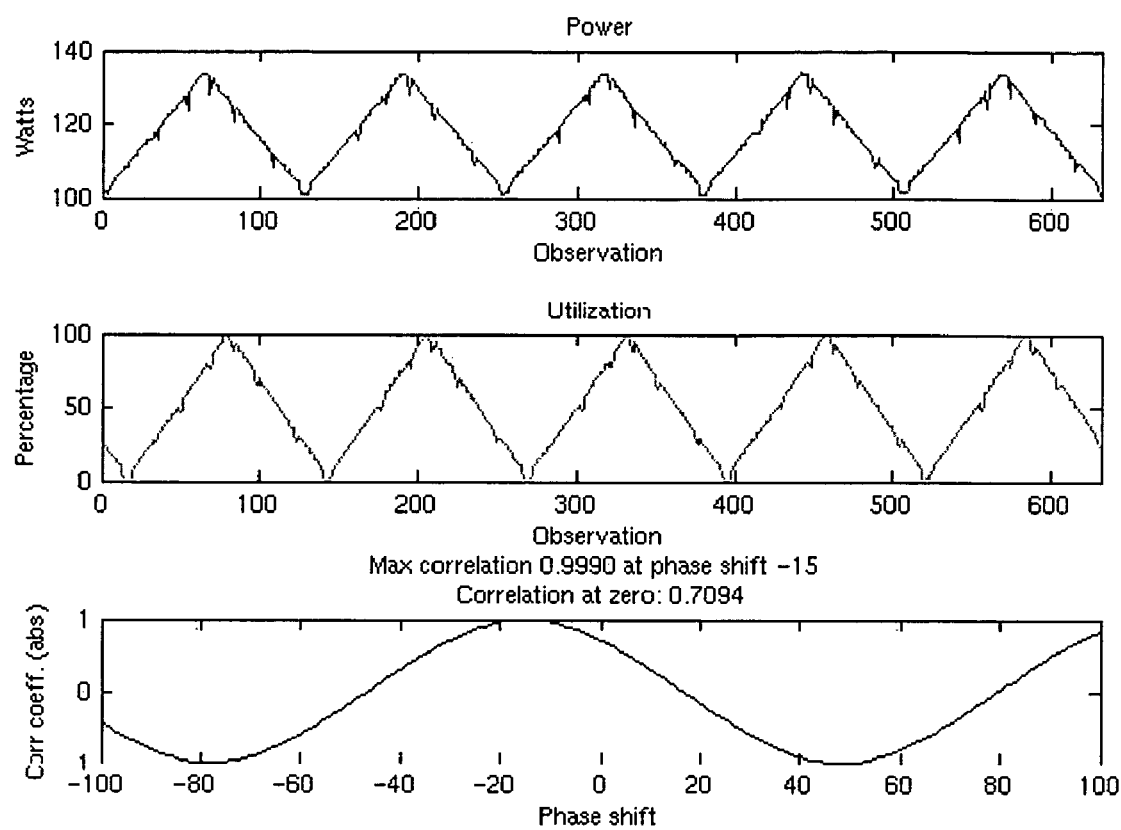
FIG. 3A illustrates graphs of two signals related to the operation of a computer system and their correlation versus phase shift in accordance with some embodiments of the present invention.
Figure 3B:
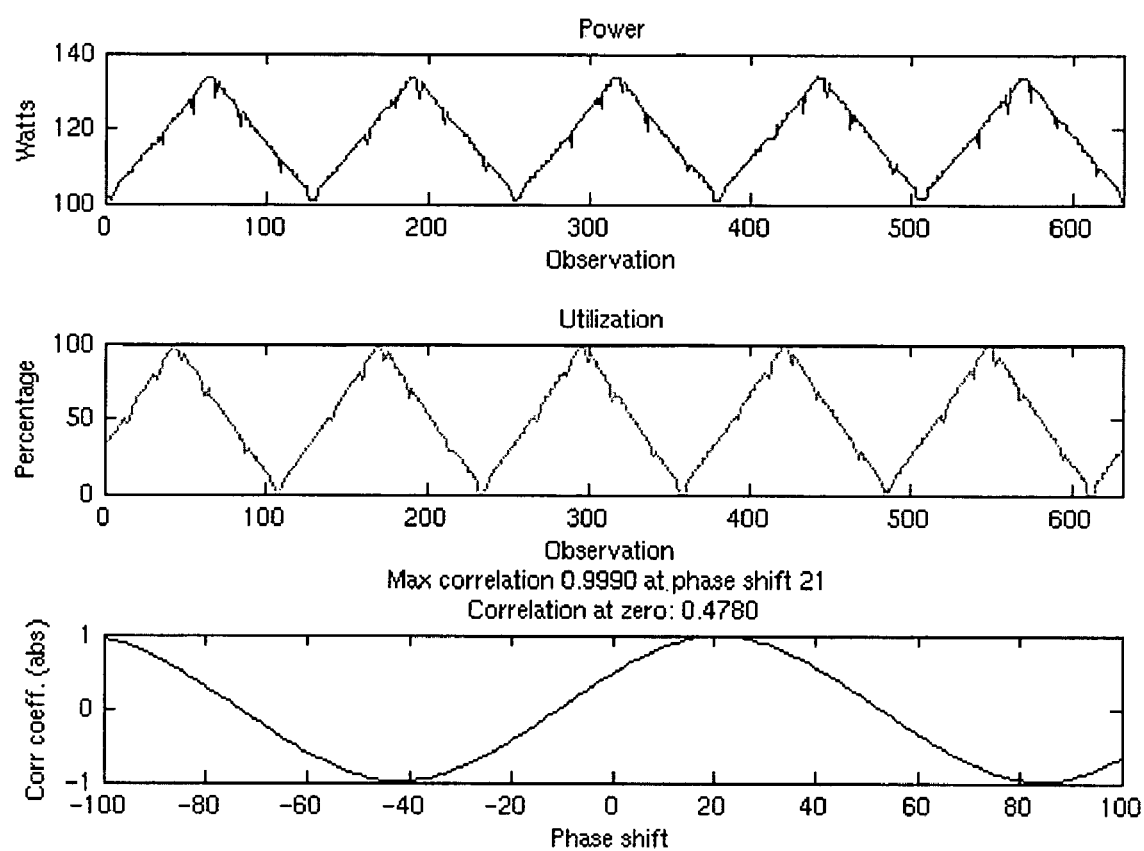
FIG. 3B illustrates graphs of two signals related to the operation of a computer system and their correlation versus phase shift in accordance with some embodiments of the present invention.
Figure 3C:
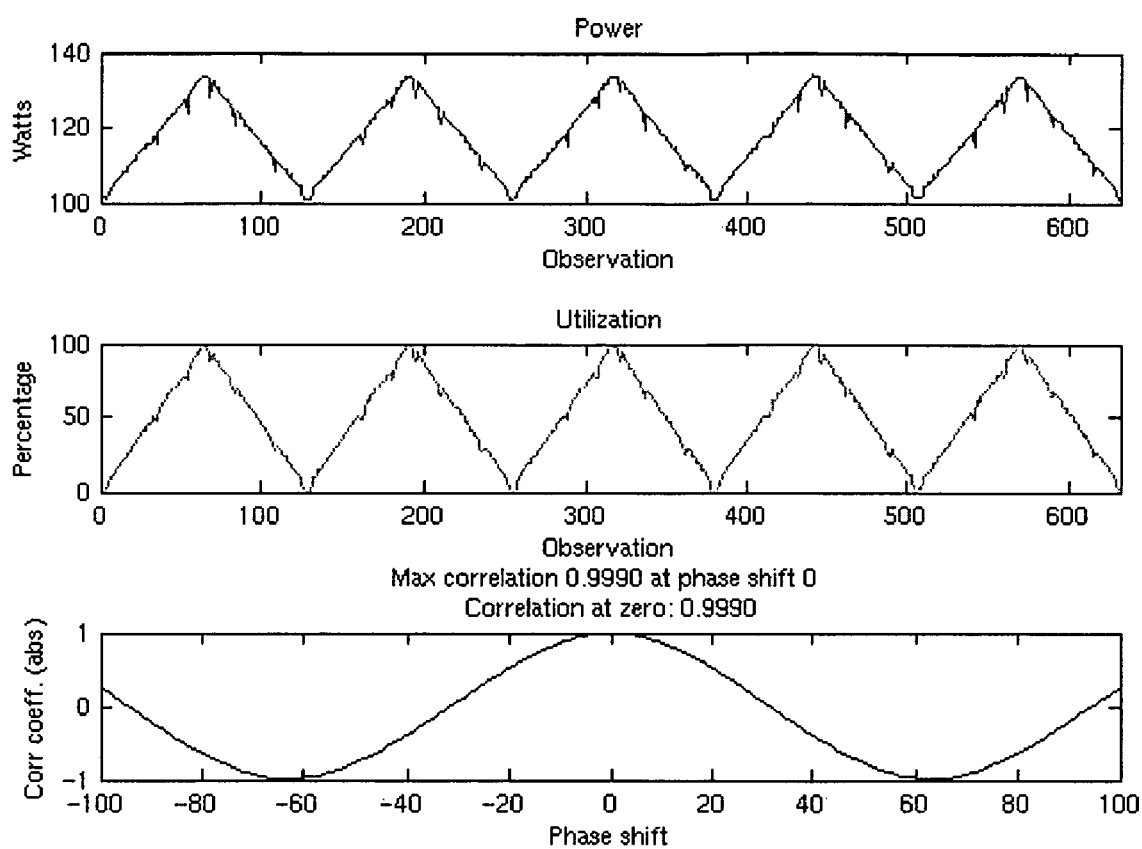
FIG. 3C illustrates graphs of two signals related to the operation of a computer system and their correlation versus phase shift in accordance with some embodiments of the present invention.

FIGS. 3A, 3B, and 3C illustrate graphs of two signals related to the operation of a computer system and their correlation vs. phase shift in accordance with some embodiments of the present invention. In FIG. 3A, the top 2 graphs depict signals representing, respectively, computer system power vs. observation sample step and percentage CPU utilization vs. observation sample step. The bottom graph illustrates a plot of the correlation coefficient vs. phase shift produced in accordance with embodiments of the invention for the signals represented in the top two graphs. The correlation coefficient vs. phase shift graph depicts a phase shift of −15 for the peak correlation between the signal represented in the top graph with respect to the signal represented in the middle graph.

In FIG. 3B, the top 2 graphs depict another set of signals representing, respectively, computer system power vs. observation sample step and percentage CPU utilization vs. observation sample step. The bottom graph illustrates a plot of the correlation coefficient vs. phase shift produced in accordance with embodiments of the invention for the signals represented in the top two graphs. The correlation coefficient vs. phase shift graph depicts a phase shift of 21 for the peak correlation between the signal represented in the top graph with respect to the signal represented in the middle graph.

In FIG. 3C, the top 2 graphs depict yet another set of signals representing, respectively, computer system power vs. observation sample step and percentage CPU utilization vs. observation sample step. The bottom graph illustrates a plot of the correlation coefficient vs. phase shift produced in accordance with embodiments of the invention for the signals represented in the top two graphs. The correlation coefficient vs. phase shift graph depicts a phase shift of 0 for the peak correlation between the signal represented in the top graph with respect to the signal represented in the middle graph.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for synchronizing signals related to the operation of a computer system, comprising:
generating a set of correlation coefficients between a first signal and a second signal, wherein each correlation coefficient is associated with a different phase shift between the first signal and the second signal; and
determining a synchronizing phase shift which is associated with a highest correlation coefficient in the set of correlation coefficients to synchronize the first signal and the second signal;
wherein the first signal includes information related to one of: a power meter signal, a temperature sensor signal, and a performance parameter signal; and
wherein the second signal includes information related to one of: the power meter signal, the temperature sensor signal, and the performance parameter signal.

2. The method of claim 1,
wherein the first signal is generated from a first sampled signal and the second signal is generated from a second sampled signal; and
wherein a sampling rate of the first sampled signal is different from a sampling rate of the second sampled signal.

3. The method of claim 2, wherein generating the first signal and the second signal involves re-sampling so that a sampling rate of the first signal is equivalent to a sampling rate of the second signal.

4. The method of claim 1, further comprising;
generating a set of correlation coefficients between the first signal and a third signal, wherein each correlation coefficient between the first signal and the third signal is associated with a different phase shift between the first signal and the third signal; and
determining a synchronizing phase shift which is associated with a highest correlation coefficient in the set of correlation coefficients between the first signal and the third signal to synchronize the first signal and the third signal.

5. The method of claim 4, wherein:
the third signal includes information related to one of: the power meter signal, the temperature sensor signal, and the performance parameter signal.

6. The method of claim 4, further comprising:
generating a set of correlation coefficients between the second signal and the third signal, wherein each correlation coefficient between the second signal and the third signal is associated with a different phase shift between the second signal and the third signal; and
determining a synchronizing phase shift which is associated with a highest correlation coefficient in the set of correlation coefficients between the second signal and the third signal to synchronize the second signal and the third signal.

7. A non-transitory computer-readable storage medium storing instructions that when executed by a computer cause the computer to perform a method for synchronizing signals related to the operation of a computer system, the method comprising:
generating a set of correlation coefficients between a first signal and a second signal, wherein each correlation coefficient is associated with a different phase shift between the first signal and the second signal; and
determining a synchronizing phase shift which is associated with a highest correlation coefficient in the set of correlation coefficients to synchronize the first signal and the second signal;
wherein the first signal includes information related to one of: a power meter signal, a temperature sensor signal, and a performance parameter signal; and
wherein the second signal includes information related to one of: the power meter signal, the temperature sensor signal, and the performance parameter signal.

8. The computer-readable storage medium of claim 7,
wherein the first signal is generated from a first sampled signal and the second signal is generated from a second sampled signal; and wherein a sampling rate of the first sampled signal is different from a sampling rate of the second sampled signal.

9. The computer-readable storage medium of claim 8, wherein generating the first signal and the second signal involves re-sampling so that a sampling rate of the first signal is equivalent to a sampling rate of the second signal.

10. The computer-readable storage medium of claim 7, further comprising;
generating a set of correlation coefficients between the first signal and a third signal, wherein each correlation coefficient between the first signal and the third signal is associated with a different phase shift between the first signal and the third signal; and
determining a synchronizing phase shift which is associated with a highest correlation coefficient in the set of correlation coefficients between the first signal and the third signal to synchronize the first signal and the third signal.

11. The computer-readable storage medium of claim 10, wherein:
the third signal includes information related to one of: the power meter signal, the temperature sensor signal, and the performance parameter signal.

12. The computer-readable storage medium of claim 10, further comprising:
generating a set of correlation coefficients between the second signal and the third signal, wherein each correlation coefficient between the second signal and the third signal is associated with a different phase shift between the second signal and the third signal; and
determining a synchronizing phase shift which is associated with a highest correlation coefficient in the set of correlation coefficients between the second signal and the third signal to synchronize the second signal and the third signal.

13. An apparatus for synchronizing signals related to the operation of a computer system, comprising:
a processor;
a generating mechanism configured to generate a set of correlation coefficients between a first signal and a second signal, wherein each correlation coefficient is associated with a different phase shift between the first signal and the second signal; and
a determining mechanism configured to determine a synchronizing phase shift which is associated with a highest correlation coefficient in the set of correlation coefficients to synchronize the first signal and the second signal;

wherein the first signal includes information related to one of: a power meter signal, a temperature sensor signal, and a performance parameter signal; and
wherein the second signal includes information related to one of: the power meter signal, the temperature sensor signal, and the performance parameter signal.

14. The apparatus of claim 13,
wherein the generating mechanism is further configured to generate the first signal from a first sampled signal and the generating mechanism is configured to generate the second signal from a second sampled signal; and
wherein a sampling rate of the first sampled signal is different from a sampling rate of the second sampled signal.

15. The apparatus of claim 14, wherein the generating mechanism is further configured to generate the first signal and the second using re-sampling so that a sampling rate of the first signal is equivalent to a sampling rate of the second signal.

16. The apparatus of claim 13, wherein
the generating mechanism is further configured to generate a set of correlation coefficients between the first signal and a third signal, wherein each correlation coefficient between the first signal and the third signal is associated with a different phase shift between the first signal and the third signal; and
the determining mechanism is further configured to determine a synchronizing phase shift, which is associated with a highest correlation coefficient in the set of correlation coefficients between the first signal and the third signal to synchronize the first signal and the third signal.

17. The apparatus of claim 16, wherein:
the third signal includes information related to one of: the power meter signal, the temperature sensor signal, and the performance parameter signal.

18. The apparatus of claim 16, wherein:
the generating mechanism is further configured to generate a set of correlation coefficients between the second signal and the third signal, wherein each correlation coefficient between the second signal and the third signal is associated with a different phase shift between the second signal and the third signal; and
the determining mechanism is further configured to determine a synchronizing phase shift which is associated with a highest correlation coefficient in the set of correlation coefficients between the second signal and the third signal to synchronize the second signal and the third signal.

* * * * *